United States Patent [19]

May et al.

[11] Patent Number: 4,803,886
[45] Date of Patent: Feb. 14, 1989

[54] CHAIN PULL ANALYZER SYSTEM

[76] Inventors: Larry May, 3971 Lakewood Dr., South, Memphis, Tenn. 38128; Peter Curtiss, 3641 Winchester Square West, Memphis, Tenn. 38118; Terry Foshee, 2104 Westchester Dr., #1, Memphis, Tenn. 38134

[21] Appl. No.: 143,673

[22] Filed: Jan. 14, 1988

[51] Int. Cl.$^4$ .............................................. G01L 5/10
[52] U.S. Cl. .................................. 73/862.39; 73/773; 340/870.38
[58] Field of Search ............................ 73/862.39, 773; 340/870.38, 870.16

[56] References Cited
U.S. PATENT DOCUMENTS
4,566,339 1/1986 Davidson et al. ................. 73/862.39

Primary Examiner—Charles A. Ruehl
Attorney, Agent, or Firm—Walker & McKenzie

[57] ABSTRACT

A chain pull analyzer system including a telemetry unit for sensing the strain experienced by the chain while under load and in operation and for transmitting a radio frequency signal proportional to the strain and a data unit for receiving the radio frequency signal transmitted by the telemetry unit and for producing strain data output based on the radio frequency signal. The telemetry unit includes a strain sensing unit for sensing the strain experienced by the chain while under load and in operation and for producing an electrical signal based on the strain, the strain sensing unit including a body member for replacing one of the center links of the chain; a signal conditioning unit for converting the electrical signal produced by the strain sensing unit to an analog signal, the signal conditioning unit including a body member for replacing one of the center links of the chain; a radio frequency transmitter unit for transmitting the analog signal of the signal conditioning unit, the radio frequency transmitter including a body member for replacing one of the center links of the chain; and a source of electrical energy for energizing the strain sensing unit, the signal conditioning unit and the radio frequency transmitter.

15 Claims, 5 Drawing Sheets

CHAIN PULL ANALYZER SYSTEM

BACKGROUND OF THE INVENTION

1. Field of the Invention

The present invention relates in general to a system for use in analyzing the tensile stresses of a chain conveyor under load.

2. Description of the Related Art

Various systems have been developed in the past to monitor and analyze the actual tensile stress of a chain conveyor while running and under a load. Some known systems involve simple tension gauges attached to the conveyor chain and manually read as the chain moves. Other systems include instrument packages and chart recorders that travel along with the conveyor chain. Davidson et al., U.S. Pat. No. 4,566,339, assigned to Southern Systems, Inc., of Memphis, Tenn., the assignee of the present invention, discloses a system that uses strain gauge, signal conditioning and radio technologies to produce an audio signal remote from the actual conveyor and proportional to the tensile stress on the conveyor chain. None of the above prior art discloses or suggests the present invention.

SUMMARY OF THE INVENTION

The present invention is directed toward providing an improved chain pull analyzer system. The chain pull analyzer system of the present invention includes a telemetry means for sensing the strain experienced by a conveyor chain while under load and in operation and for transmitting a radio frequency signal proportional to the strain, and includes a data means for receiving the radio frequency signal transmitted by the telemetry means and for producing strain data output based on the radio frequency signal. The telemetry means includes a strain sensing means for sensing the strain experienced by the chain while under load and in operation and for producing an electrical signal based on the strain, the strain sensing means including a body member for replacing one of the center links of the chain; a signal conditioning means for converting the electrical signal produced by the strain sensing means to an analog signal, the signal conditioning means including a body member for replacing one of the center links of the chain; a radio frequency transmitter means for transmitting the analog signal of the signal condition means, the radio frequency transmitter including a body member for replacing one of the center links of the chain; and a source of electrical energy for energizing the strain sensing means, the signal conditioning means and the radio frequency transmitter.

One objective of the present invention is to provide a versatile and convenient system for measuring, recording and displaying strain data on conveyor system chains.

Another objective of the present invention is to divide the system into a first major functional group (i.e., a telemetry group) that is mechanically coupled to the chain on which strain is to be measured, that converts the strain into an analog signal and that transmits this signal by a low power ultra high radio frequency transmitter; and a second major functional group (i.e., a data display group) that receives the transmitted signal from the radio frequency transmitter and displays it on a digital display, bar graph and chart recorder.

DESCRIPTION OF THE PREFERRED EMBODIMENT

Figure 1A:
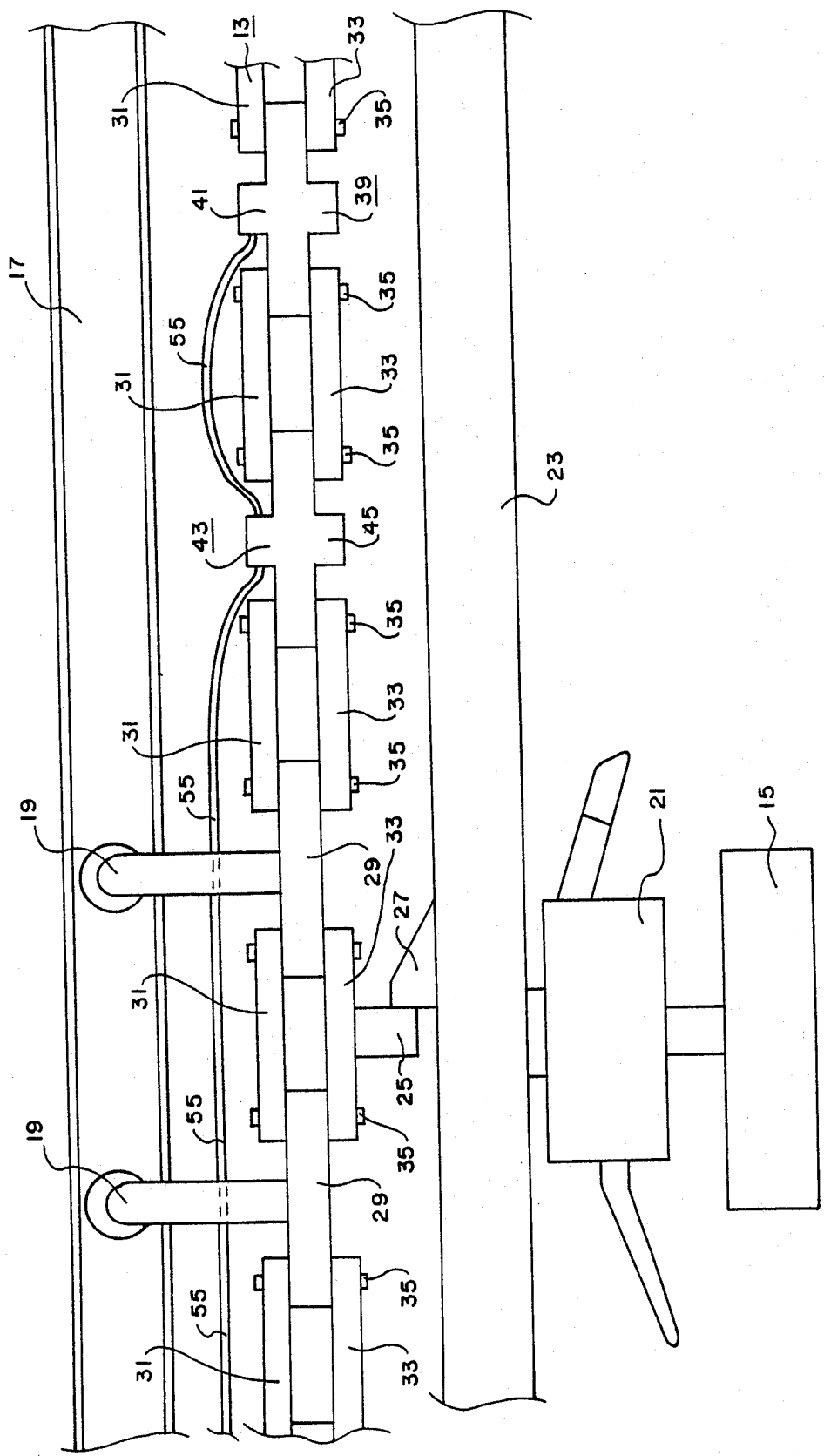
FIG. 1A is a side elevational view of a portion of a conveyor system with the chain pull analyzer system of the present invention associated therewith.

The preferred embodiment of the chain pull analyzer system 11 of the present invention is used with a conveyor system of the type including a driven conveyor chain 13 for use in moving one or more loads 15 from one location to another. The conveyor system may be the type having elongated chain support rails 17 from which the chain 13 is movably suspended by roller supports 19 or the like, and with a load 15 supported from one or more trolleys 21 which are rollably supported on elongated trolley rails 23 and which are driven along the trolley rails 23 via the interaction between drive members 25 attached to the chain 13 and drive members 27 attached to the trolley 21 as will now be apparent to those skilled in the art. The chain 13 includes a plurality of elongated center links 29, a plurality of elongated top connecting plates 31, a plurality of elongated bottom connecting plates 33, and a plurality of connecting pins 35 for pivotally connecting the center links 29, top plates 31 and bottom plates 33 to one another as will now be apparent to those skilled in the art to form an elongated, pivotable chain member. The roller supports 19 may be fixedly attached to certain ones of the center links 29 and the drive elements 25 may be fixedly attached to certain ones of the bottom plates 33 as clearly shown in FIG. 1A. The specific construction and operation of the conveyor system may vary as will now be apparent to those skilled in the art. As is known to those skilled in the art, the chain 13 will experience various tensile stresses as it moves the load 15. The specific stress or tension, in pounds, being exerted by or against the chain 13 at any specific point in the conveyor system will depend on a number of factors, such as malfunctions in the conveyor path (e.g., faulty rollers, rough and/or binding tracks, excessive take-up pressures, etc.), the design of the conveyor system at any specific point (e.g., the angle of the support rails, the ambient temperatures at that specific area, etc.), and the like. The system 11 allows the actual tensile stress or actual pounds of force (tension) of the chain 13 to be monitored while running and under a load at any specific point in the conveyor system. From such data, many things may be deduced about the operation of the conveyor system including any malfunctions in the conveyor path, additional drive requirements, etc., to allow more efficient and dependable designs and maintenance.

Figure 2:
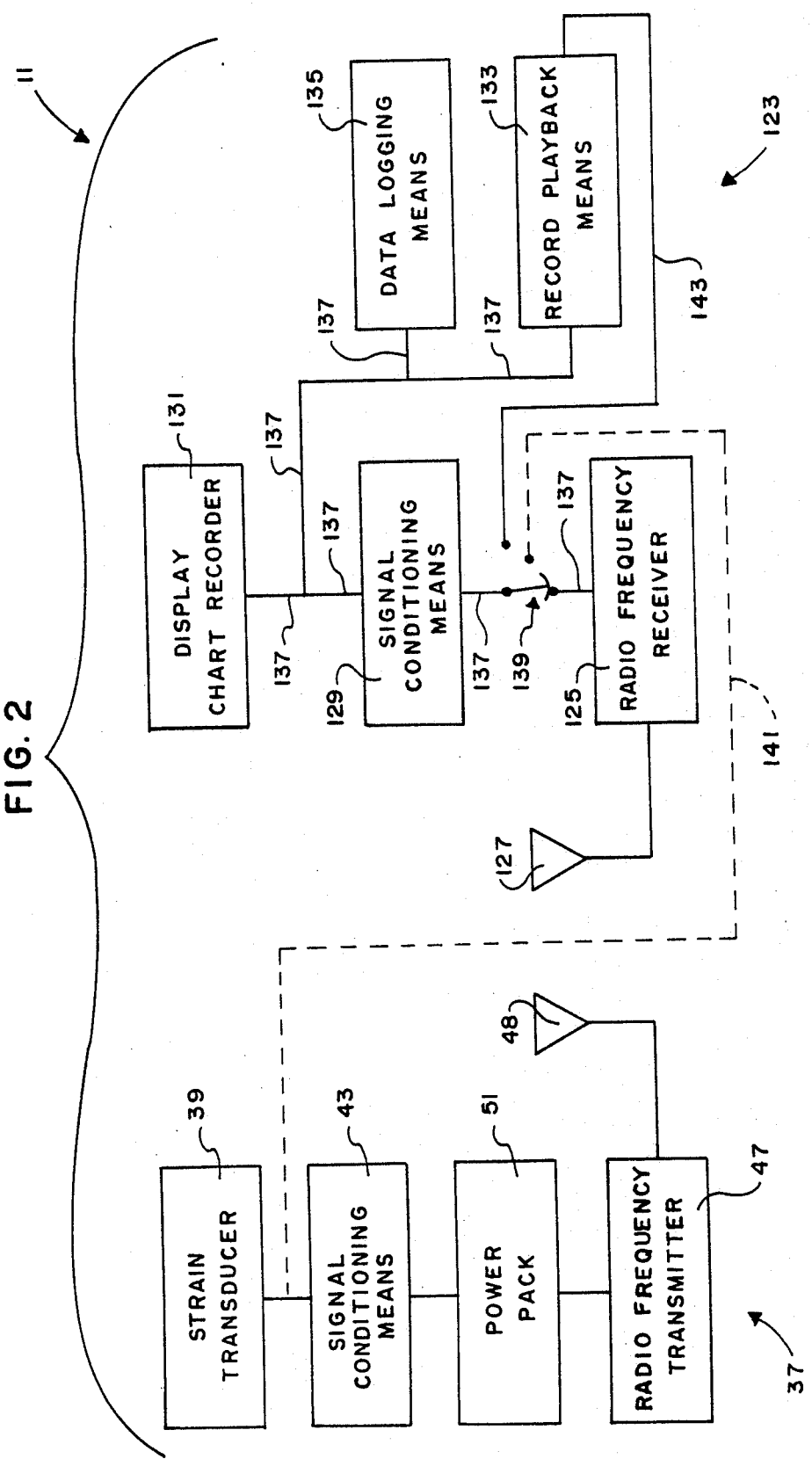
FIG. 2 is block diagram of various components of the chain pull analyzer system of the present invention.
Figure 3:
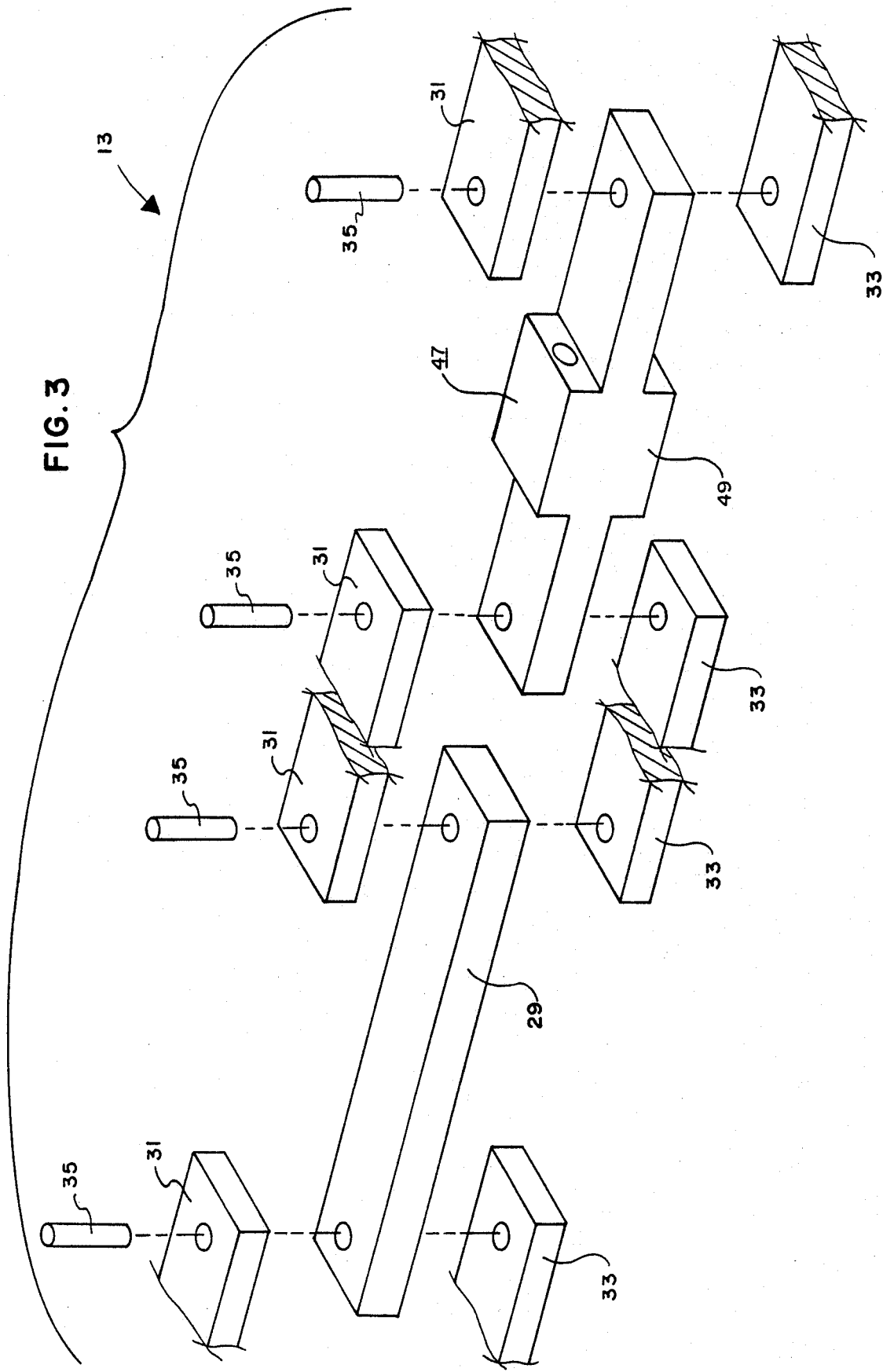
FIG. 3 is an exploded perspective view of a portion of the conveyor system of FIG. 1 and a portion of the chain pull analyzer system of the present invention.

The system 11 includes a telemetry unit or means 37 for sensing the strain experienced by the chain 13 and for transmitting a radio frequency signal proportional to that strain (see, in general, FIG. 2).

The telemetry unit 37 includes a strain sensing means or transducer 39 for sensing the strain experienced by the chain 13 while under load and in operation and for producing an electrical signal based on the tension on the chain 13. The working components of the strain transducer 39 of the present inention are preferably mounted within a body member 41 for replacing one of the center links 29 of the chain 13. Thus, the body member 41 preferably has apertures through each end for being pivotally attached to sequential sets of plates 31, 33 by pins 35 as will now be apparent to those skilled in the art. The specific operation and construction of the strain transducer 39 may vary as will now be apparent to those skilled in the art. Thus, the strain transducer 39 may be constructed and operated basically similar to the "sensing means 23" disclosed in Davidson et al, U.S. Pat. No. 4,566,339, issued Jan. 28, 1986.

The telemetry unit 37 also includes a signal conditioning means 43 for converting the electrical signal produced by the strain transducer 39 to an analog signal. The working components of the signal conditioning means 43 of the present invention are preferably mounted within a body member 45 for replacing one of the center links 29 of the chain 13. Thus, the body member 45 preferably has apertures through each end for being pivotally attached to sequential sets of plates 31, 33 by pins 35 as will now be apparent to those skilled in the art. The specific operation and components of the signal conditioning means 43 may vary as will now be apparent to those skilled in the art. Thus, the signal conditioning means 43 may be constructed and operate basiclly similar to the "converter means 53" disclosed in Davidson et al, U.S. Pat. No. 4,566,339, issued Jan. 28, 1986. However, it will be understood that all individual electrical components of the signal condition means 43 are located within the body member 45 rather than being mounted within a "container 55" attached to the conveyor chain by bolts or the like as disclosed in the U.S. Pat. No. 4,566,339.

The telemetry unit 37 also includes a radio frequency transmitting means or transmitter 47 for transmitting the analog signal of the signal conditioning means 43. All working components of the radio frequency transmitter 47 with the exception of an antenna 48 are preferably mounted within a body member 49 for replacing one of the center links 29 of the chain 13. Thus, the body member 49 preferably has apertures through each end for being pivotally attached to sequential sets of plates 31, 33 by pins 35 as will now be apparent to those skilled in the art. The specific operation and components of the radio frequency transmitter 47 may vary as will now be apparent to those skilled in the art. Thus, the radio frequency transmitter 47 may be constructed and operate basically similar to the "transmitting means 25" disclosed in Davidson et al, U.S. Pat. No. 4,566,339, issued Jan. 28, 1986. However, it will be understood that all individual electrical components of the radio frequency transmitter 47 are located within the body member 45 rather than being mounted within a "container 55" attached to the conveyor chain by bolts or the like as disclosed in the U.S. Pat. No. 4,566,339. The transmitter 47 preferably provides a low power ultra high frequency signal.

The telemetry unit 37 also includes a power means or pack 51 or other source of electrical engery for energizing the strain transducer 39, signal conditioning means 43 and transmitter 47. The working components of the power pack 51 of the present invention are preferably mounted within a body member 53 for replacing one of the center links 29 of the chain 13. Thus, the body member 53 preferably has apertures through each end for being pivotally attached to sequential sets of plates 31, 33 by pins 35 as will now be apparent to those skilled in the art. The specific operation and construction of the power pack 51 may vary as will now be apparent to those skilled in the art. Thus, the power pack 51 may operate and may be constructed and operate basically similar to the "source of electrical energy 49" disclosed in Davidson et al, U.S. Pat. No. 4,566,339, issued Jan. 28, 1986. However, it will be understood that all individual components of the power pack 51 are located within the body member 53 rather than being mounted within a "container 55" attached to the conveyor chain by bolts or the like as disclosed in the U.S. Pat. No. 4,566,339 patent.

Figure 1B:
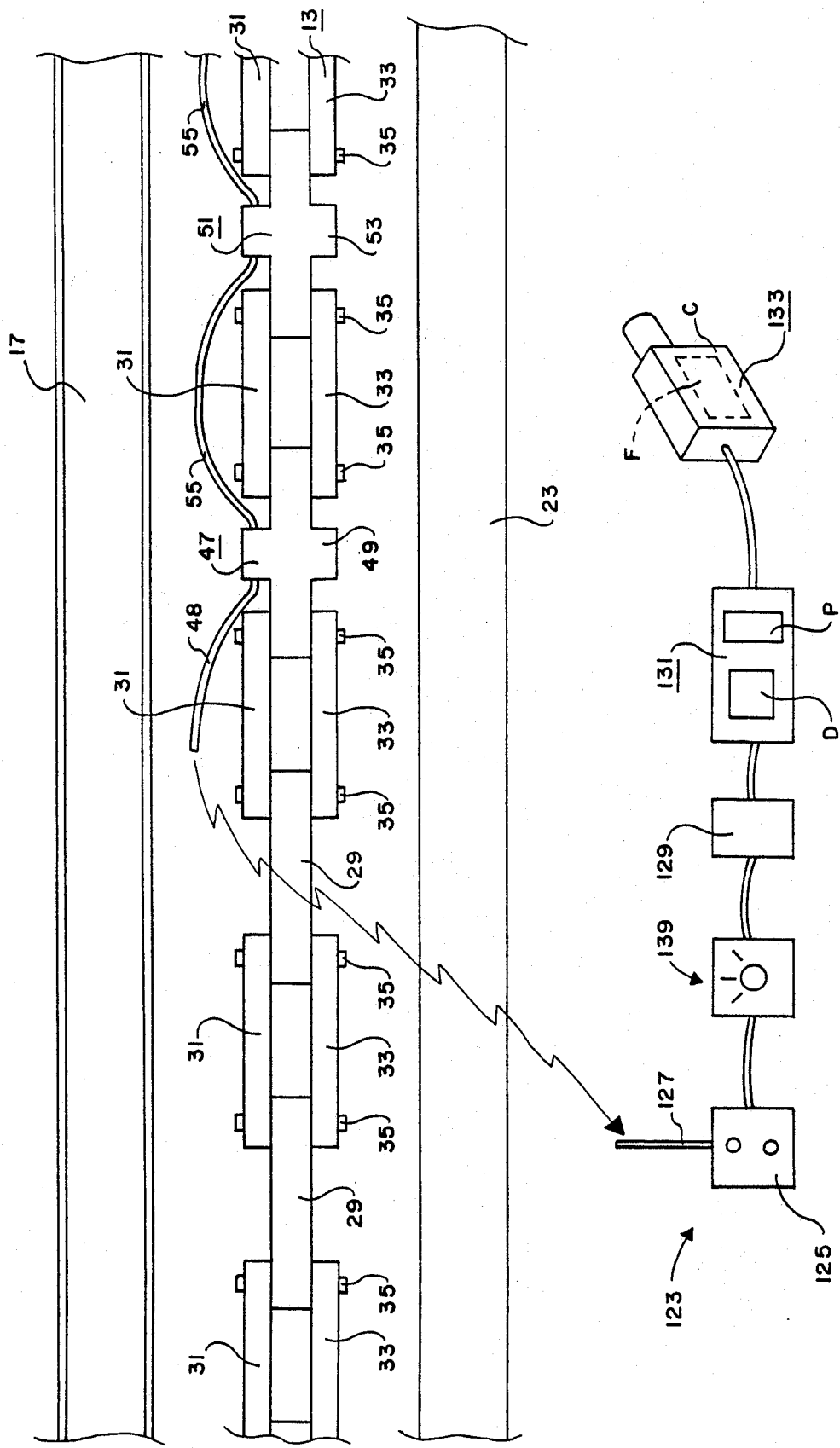
FIG. 1B is a continuation of the left end of FIG. 1A.

The various body members 41, 45, 49, 53 may be positioned in the chain 13 in various arrangements as will now be apparent to those skilled in the art and electrically coupled to one another by appropriate flexible, electrical conductors 55 as will now be apparent to those skilled in the art (see, for example, FIGS. 1A and 1B). Further, it should be noted that depending on the size of the chain 13, two or more of the various means 39, 43, 47, 51 may be mounted within a single body member 41, 45, 49, 53. In any event, a key feature of the present invention is the combination of the various components of the telemetry unit 37 integral with the chain 13 (e.g., in place of a plurality of the center links 29 of the chain 13) and within the "envelope" transversed by the chain 13 (i.e., having a cross-sectional area substantially no larger than the cross sectional area of the chain 13) so as to reduce to a minimum any possible physical interference of the various components of the telementry unit 37 with any portion of the conveyor system or the like.

Figure 4:
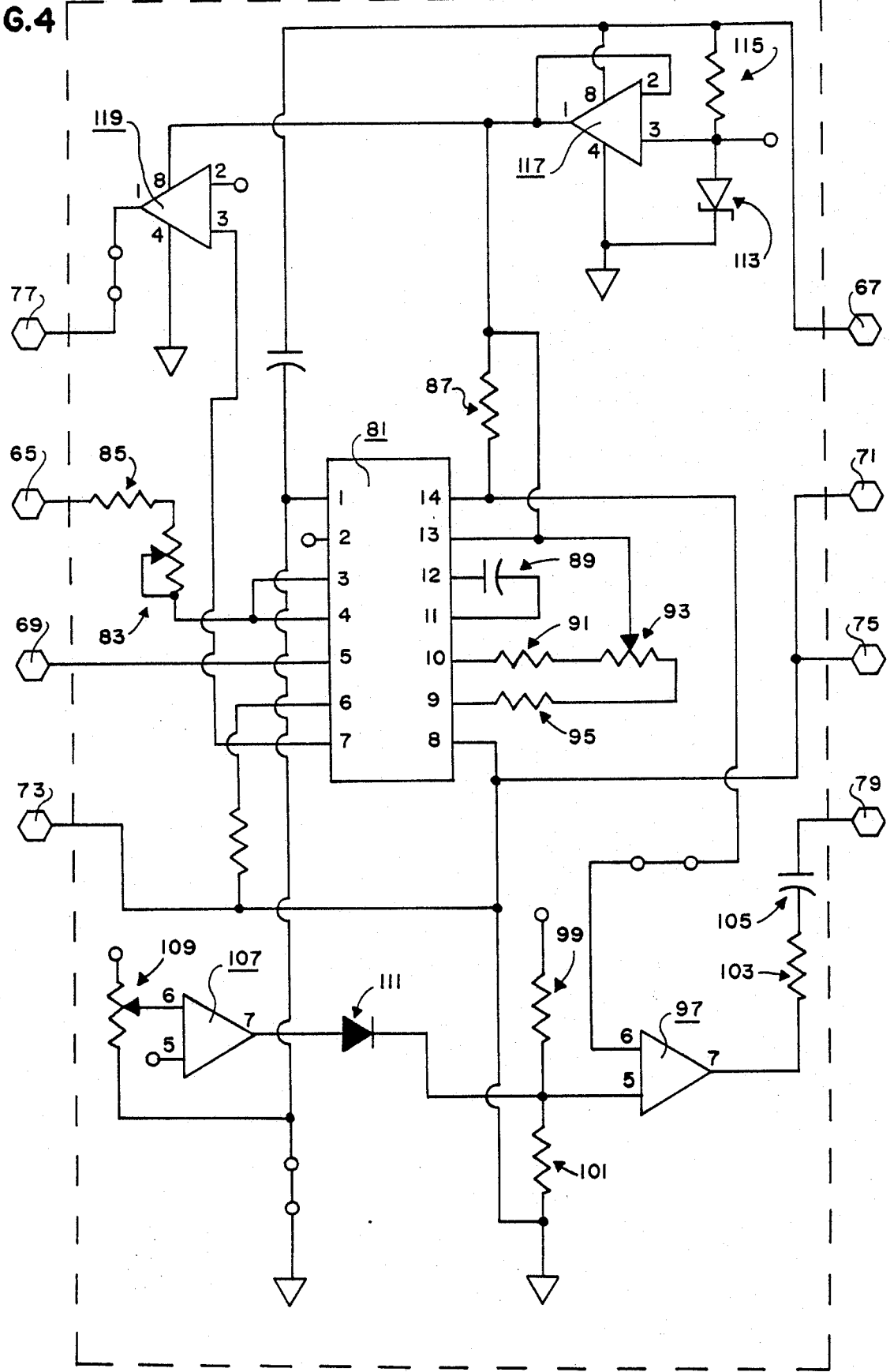
FIG. 4 is a schematic view of the electrical components of a signal conditioning means of the chain pull analyzer system of the present invention.

The signal condition means 43 is preferably constructed in the unique manner shown in FIG. 4. Thus, the signal condition means 43 preferably has a first terminal 65, a second terminal 67, a third terminal 69, a fourth terminal 71, a fifth terminal 73, a sixth terminal 75, a seventh terminal 77 and an eighth terminal 79. The strain transducer 39 is connected to the first, third, fifth and seventh terminals 65, 69, 73, 77. The second and fourth terminals 67, 71 are connnected to battery voltage positive and negative potentials, respectively, of the power pack 51. The battery voltage may be from 8 to 15 volts, direct current. The fourth and sixth terminals 71, 75 are identical electrically. The eigth terminal 79 is the signal output which is connected to the modulation input of the transmitter 47. When strain (pull or tension) is caused on the transducer 39, a corresponding and proportional change in resistance occurs which causes the current through the transducer bridge (not shown but well known to those skilled in the art) to change proportionally. The current source is pin 3 of integrated circuit 81, which is also connected to pin 4 of the integrated circuit 81 which is a negative signal connection to an instrument amplifier internal to the integrated circuit 81. The current flows through resistors 83, 85 which establish the range (the upper frequency limit of the output signal), through the transducer bridge via the first terminal 65, then through the third terminal 69, back to the integrated circuit 81 to pin 5, which is the positive signal input of the instrument amplifier of the integrated circuit 81. The internal operation of the integrated circuit 81 is well known to those skilled in the art and is described in the manufacturer's literature. The instrument amplifier in the integrated circuit 81 senses a proportional voltage resulting from the above described current and in operation with resistor 87, capacitor 89, resistor 91, resistor 93, resistor 95, resistor 83 and resistor 85 causes an output frequency at pin 14 of the integrated circuit 81. Resistors 91, 93, 95 establish the "zero offset", that is, the output signal frequency (500 Hertz) corresponding to zero pounds of tension. The circuit and mathematical relationships of the input current, circuit components and output frequency are well known to those skilled in the art and are described in the manufacturer's literature. The integrated circuit 97, resistor 99, resistor 101, resistor 103 and capacitor 105 comprise a buffer amplifier, the purpose of which is to isolate the integrated circuit 81 from external electrical noise and to provide a means of interrupting (turning off) the output frequency signal in the event of a discharged battery. The integrated circuit 107, resistor 109, and diode 111 comprise a circuit which compares battery voltage with a referance voltage supplied by zener diode 113 and resistor 115. When the battery voltage decreases to the level at which the voltage on pin 6 of the integrated circuit 107 is less than the reference voltage on pin 5 thereof, the output voltage on pin 7 thereof goes positive to near supply voltage thus biasing diode 111 "on"—driving pin 5 of the integrated circuit 97 positive which drives its output pin 7 to near positive supply voltage effectively blocking the output frequency signal being supplied from pin 14 of the integrated circuit 81. The resistor 109 (a potentiometer) provides a means of setting the point of the battery discharge curve at which the above described "blocking" takes place. When the battery voltage is above this point, the diode 111 is biased "off" (non-conducting) and allows the integrated circuit 97 to operate normally (unblocked), isolating and transmitting the output frequency signal from pin 14 of the integrated circuit 81, the eight terminal 79 and from there to the transmitter 47. The integrated circuit 117 is a "unity" amplifier, the purpose of which is to provide a stable unvarying supply voltage to the rest of the signal conditioning means 43. The integrated circuit 119 is another "unity" amplifier whose referance voltage is provided by pin 7 of the integrated circuit 81. The integrated circuit 119 isolates pin 7 of the integrated circuit 81 and acts as a current source with stable voltage for the transducer 39 (commonly referred to as "exitation"). The operation and construction of the specific signal conditioning means 43 shown in FIG. 4 and described hereabove will now be apparent to those skilled in the art.

The system 11 includes a data unit or means 123 for receiving the radio frequency signal transmitted by the telemetry unit 37 and for producing strain data ouput based on such signal by recording and/or displaying strain data, etc. (see, in general, FIG. 2). The specific operation and construction of the data unit 123 may vary as will now be apparent to those skilled in the art. Thus, the data unit 123 may operate and may be constructed basically similar to the "receiving means 27" disclosed in Davidson et al, U.S. Pat. No. 4,566,339, issued Jan. 28, 1986. The preferred embodiment of the data unit 123 is an improvement over the receiving means disclosed in the U.S. Pat. No. 4,566,339 and includes a radio frequency receiver 125 having an antenna 127 for receiving the radio frequency carrier signal from the transmitter 47, a signal conditioning means 129 for converting the analog signal received by the receiver 125 into an electrical signal, and data output means for producing a "readable" output of the signal from the signal conditioning means 129. The data output means preferably includes a display chart recorder unit or means 131 for displaying and/or recording the signal from the signal conditioning means 129. The construction and operation of the receiver 125 and signal conditioning means 129 may be any specific type as will now be apparent to those skilled in the art. The display chart recorder 131 preferably includes a numerical or digital display D (see FIG. 1B) for displaying the chain pull in pounds (readings from 0 to 5100 pounds will, for example, be displayed), and a bar graph display showing the same information as the numerical display except in a bar graph form which indicates 0 to 100 per cent of range. The bar graph display preferably includes a variable speed chart printer P (see FIG. 1B) to print the range at a speed proportional to the speed of the chain 13. The display chart recorder 131 may include up to four alarms programmed into the unit, a "low" alarm at 0 pounds pull to indicate either loss of signal, broken chain, insufficient tension, etc., and a "high" alarm programmed at 70% of the range to indicate a more-than-the-normally-expected chain pull. A second "high" alarm may be programmed at 100% of the range to indicate over range readings. The alarm points may be indicated on the bar graph display by a lighted element if the alarm point is above the present reading by an unlighted element, if the alarm point is below the present reading, and by a flashing element, if the alarm point has been exceeded. The display chart recorder 131 preferably prints out the following information every 10 minutes: the current date, the time, the range readout with zero digit on the left side of the chart and the high range on the right side, corresponding to the value of the chart, the factor being measured (in this case, the strain), the unit being displayed (pounds), and the chart speed, etc. The construction and operation of such data output means will now be apparent to those skilled in the art.

The data unit 123 may also include a record playback unit or means 133 for recording and/or playing back an audio recording of the signal from the signal conditioning means 129. Thus, the record playback unit 133 may consist of a typical cassette recorder of any type well known to those skilled in the art for being electrically coupled to the audio output of the signal conditioning means 129. Preferably, the record playback unit 133 includes a standard video camera C having the audio input thereof electrically coupled to the audio output of the signal conditioning means 129 (see FIG. 1B) whereby the camera C can be used to record a video image of the chain 13 on standard video film F as the radio frequency signal is transmitted by the telemetry unit 37 and for similtaneously making an audio recording of the analog signal transmitted via radio transmitter on the audio portion of the video film F as will now be apparent to those skilled in the art.

The data unit 123 may also include a data logging unit or means 135 coupled to the output of the signal conditioning means 129 as clearly shown in FIG. 2. The operation and construction of such a data logging unit 135 will now be apparent to those skilled in the art.

The various components of the data unit 123 are electrically coupled to one another by appropriate electrical conductors 137. Electrical energy may be supplied to the various components of the data unit 123 by any means now apparent to those skilled in the art.

A three-way switch 139 is preferably provided in the conductor 137 between the receiver 125 and the signal condition means 129 to allow the system 11 to be easily changed from a telemetry mode to a direct mode or a playback mode. More specifically, in the telemetry mode, the switch 139 electrically connects the receiver 125 to the signal conditioning means 129 as shown in FIG. 2 whereby the receiver 125 will receive the radio frequency carrier signal from the transmitter 47 and transfer it to the signal conditioning means 129. In the direct mode, the switch 139 electrically connects the signal conditioning means 129 directly to the strain transducer 39 via an auxiliary direct connection electrical conductor 141 (see FIG. 2). In the playback mode, the switch 139 electrically connects the output of the record playback means 133 to the signal conditioning means 129 via an electrical conductor 143 whereby the audio portion of a film F or cassette, etc., can be played back through the display chart recorder 131 as will now be apparent to those skilled in the art.

Although the present invention has been described and illustrated with respect to a preferred embodiment and a preferred use therefor, it is not to be so limited since modifications and changes can be made therein which are within the full intended scope of the invention.

I claim:

1. A chain pull analyzer system for monitoring the tensile stresses of a conveyor chain while under load and in operation, said chain including a plurality of elongated center links, a plurality of connecting plates, and a plurality of connecting pins for pivotally connecting said center links to said connecting plates, said system comprising:
   (a) telemetry means for sensing the strain experienced by said chain while under load and in operation and for transmitting a radio frequency signal proportional to said strain, said telemetry means including:
      (i) a strain sensing means for sensing said strain experienced by said chain while under load and in operation and for producing an electrical signal based on said strain, said strain sensing means including a body member for replacing one of said center links of said chain;
      (ii) a signal conditioning means for converting said electrical signal produced by said strain sensing means to an analog signal, said signal conditioning means including a body member for replacing one of said center links of said chain;
      (iii) a radio frequency transmitter means for transmitting said analog signal of said signal conditioning means, said radio frequency transmitter including a body member for replacing one of said center links of said chain;
      (iv) a source of electrical energy for energizing said strain sensing means, said signal conditioning means and said radio frequency transmitter; and
   (b) data means for receiving said radio frequency signal transmitted by said telemetry means and for producing strain data output based on said radio frequency signal.

2. The system of claim 1 in which said data means includes a radio frequency receiver for receiving said radio frequency signal from said transmitter, a signal conditioning means for converting said analog signal received by said receiver into an electrical signal, and data output means for producing a "readable" output of said signal from said signal conditioning means.

3. The system of claim 2 in which said data output means includes a display chart recorder means for displaying said signal from said signal conditioning means.

4. The system of claim 3 in which said display chart recorder includes a digital display for displaying the chain pull in pounds, a bar graph display for displaying the chain pull as a bar graph.

5. The system of claim 4 in which said bar graph display includes a variable speed chart printer to print said bar graph at a speed proportional to the speed of said chain.

6. The system of claim 2 in which said data output means includes a record playback means for recording an audio recording of said signal from said signal conditioning means.

7. The means of claim 6 in which said record playback means includes a video camera having the audio input thereof electrically coupled to the audio output of said signal conditioning means for recording a video image of said chain on standard video film as said radio frequency signal is transmitted by said telemetry means and for similtaneously making an audio recording of the analog signal transmitted via radio transmitter on the audio portion of said video film.

8. The system of claim 6 in which is included a direct connection electrical conductor for extending between the output of said strain sensing means of said telemetry means and the input of said signal conditioning means of said data means for providing a direct electrical connection therebetween.

9. The system of claim 8 in which said data means includes a three-way switch for allowing said signal conditioning means of said data means to be selectively electrically coupled to said radio frequency receiver of said data means, or to said direct connection electrical conductor, or to the output of said record playback means for allowing the audio portion of a recording of said signal from said signal conditioning means of said data means to be played back through said display chart recorder.

10. The system of claim 1 in which said source of electrical energy of said telemetry means includes a body member for replacing one of said center links of said chain.

11. The system of claim 10 in which all working components of said strain sensing means are mounted within said body member thereof.

12. The system of claim 11 in which all working components of said signal conditioning means are mounted within said body member thereof.

13. The system of claim 12 in which said radio frequency transmitter means includes an antenna, and in which all working components of said radio frequency transmitter means with the exception of said antenna are mounted within said body member thereof.

14. The system of claim 1 in which said strain sensing means, said signal conditioning means, said radio frequency transmitter means and said source of electrical energy of said telemetry means are integral with said chain and positioned within the envelope transversed by said chain.

15. The system of claim 1 in which said strain sensing means, said signal conditioning means, said radio frequency transmitter means and said source of electrical energy of said telemetry means each have a cross-sectional area substantially no larger than the cross-sectional area of said chain.

* * * * *